United States Patent
Yu et al.

(10) Patent No.: US 9,683,544 B2
(45) Date of Patent: Jun. 20, 2017

(54) WAVE POWER GENERATING APPARATUS

(71) Applicant: Postech Academy-Industry Foundation, Gyeongsangbuk-do (KR)

(72) Inventors: Son-Cheol Yu, Gyeongsangbuk-do (KR); Jason Seungjoo Lee, Seoul (KR); Ju Hyun Pyo, Gyeongsangnam-do (KR); Han Gil Joe, Gyoengsangnam-do (KR); Jeong Hwe Gu, Daegu (KR); Hyeon Woo Cho, Gyeongsangbuk-do (KR)

(73) Assignee: Postech Academy-Industry Foundation, Gyeongsangbuk-do (KR)

( * ) Notice: Subject to any disclaimer, the term of this patent is extended or adjusted under 35 U.S.C. 154(b) by 519 days.

(21) Appl. No.: 14/624,144

(22) Filed: Feb. 17, 2015

(65) Prior Publication Data

US 2015/0240779 A1    Aug. 27, 2015

(30) Foreign Application Priority Data

Feb. 18, 2014    (KR) ........................ 10-2014-0018726

(51) Int. Cl.
*F03B 13/22*    (2006.01)

(52) U.S. Cl.
CPC .......... *F03B 13/22* (2013.01); *F05B 2240/40* (2013.01); *F05B 2240/93* (2013.01); *Y02E 10/28* (2013.01); *Y02E 10/38* (2013.01)

(58) Field of Classification Search
CPC .......... F03B 13/22; Y02E 10/28; Y02E 10/38; F05B 2240/40; F05B 2240/93
USPC ....... 60/497, 498, 499, 505, 506; 290/42, 53
See application file for complete search history.

(56) References Cited

U.S. PATENT DOCUMENTS

| | | | |
|---|---|---|---|
| 2009/0091134 A1* | 4/2009 | Lyatkher | F03B 13/20 290/54 |
| 2012/0068670 A1* | 3/2012 | Bersiek | F03D 1/025 322/30 |
| 2012/0119499 A1* | 5/2012 | Kato | F03B 17/063 290/52 |
| 2013/0127168 A1* | 5/2013 | Dragic | F03B 13/1855 290/53 |

(Continued)

FOREIGN PATENT DOCUMENTS

| | | |
|---|---|---|
| JP | 2010511115 A | 4/2010 |
| KR | 1020110053488 A | 4/2013 |
| KR | 1020140014302 A | 2/2014 |

*Primary Examiner* — Hoang Nguyen
(74) *Attorney, Agent, or Firm* — Reinhart Boerner Van Deuren P.C.

(57) ABSTRACT

A wave power generating apparatus is provided. A generator including a housing and a drive shaft coupled to the housing is coupled to a floating part that is floatable on a sea. The drive shaft is positioned on an extension of the center of rotation extending from the housing. A first rotary unit is coupled to the generator housing, is rotatable in a first direction together with the housing about the extension of the center of rotation, and includes a first blade able to pivot about a first pivot axis perpendicular to the extension of the center of rotation. A second rotary unit is coupled to the drive shaft of the generator, is rotatable in a second direction opposite to a direction in which the first rotary unit rotates, and includes a second blade able to pivot about a second pivot axis perpendicular to the extension of the center of rotation.

17 Claims, 5 Drawing Sheets

(56) References Cited

U.S. PATENT DOCUMENTS

2013/0145753 A1\* 6/2013 Becker ...................... F01D 7/00
  60/327
2013/0334816 A1\* 12/2013 Houis ...................... F03B 13/14
  290/42

\* cited by examiner

WAVE POWER GENERATING APPARATUS

CROSS-REFERENCE TO RELATED PATENT APPLICATIONS

This patent application claims the benefit of Korean Patent Application No. 10-2014-0018726, filed on Feb. 18, 2014, the entire teachings and disclosure of which are incorporated herein by reference thereto.

BACKGROUND OF THE INVENTION

Field of the Invention

The present invention relates to a wave power generating apparatus.

Description of the Related Art

Typical power generation technologies include water-power generation using waterpower, thermal-power generation using fossil fuel, nuclear power generation using nuclear power, etc. These power generating technologies require large not only power facilities but also heavy cost to operate the power facilities. In addition, such conventional power generation facilities can only be constructed in limited places.

The fossil fuels reserves are becoming diminished. Furthermore, the problems of the exhaustion of fossil fuel and environmental pollution are becoming increasingly prominent issue, thus renewable energy-solar, wind, geothermal, tidal, wave-widely have been being required to be developed.

The development of power generating apparatuses using natural energy sources is underway. Among the power generating apparatuses, a wave power generating apparatus generates electricity by converting the kinetic energy of wave into electrical energy.

The information presented in the Background of the Invention section is only for the enhancement of understanding of the background of the invention, and should not be taken as an acknowledgment or as any form of suggestion that this information forms a prior art that would already be known to a person skilled in the art.

SUMMARY OF THE INVENTION

Accordingly, the present invention is intended to propose a wave power generating apparatus.

In order to achieve the above object, according to one aspect of the present invention, there is provided a wave power generating apparatus including: a floating part floatable on a sea; a generator coupled to the floating part, wherein the generator includes a housing and a drive shaft coupled to the housing, the drive shaft being positioned on an extension of a center of rotation extending in a top-bottom direction from the housing; a first rotary unit coupled to the housing of the generator, the first rotary unit being rotatable in a first direction together with the housing about the extension of the center of rotation, wherein the first rotary unit includes a first blade able to pivot about a first pivot axis perpendicular to the extension of the center of rotation; and a second rotary unit coupled to the drive shaft of the generator, the second rotary unit being rotatable together with the drive shaft in a second direction opposite to a direction in which the first rotary unit rotates, wherein the second rotary unit includes a second blade able to pivot about a second pivot axis perpendicular to the extension of the center of rotation. When the generator, the first rotary unit and the second rotary unit are moved upwardly and downwardly in water by waves in a state in which the floating part is on a surface of sea and the first rotary unit and the second rotary unit are underwater, the first blade and the second blade rotate the housing and the drive shaft in opposite directions with a force from water applied to each of the first and second blades, such that the generator generates electricity.

According to an embodiment of the present invention, the first rotary unit may include a first frame coupled to the housing of the generator, the first blade being disposed on the first frame.

The first frame may be in a shape of a ring that is disposed about the extension of the center of rotation. A plurality of the first blades may be disposed on an outer circumference of the ring-shaped first frame and are spaced apart from each other.

The first blade may be positioned at rear of the first pivot axis when viewed in the direction in which the first rotary unit rotates.

The first blade may pivot to an angle of 0°~90° in a top direction and an angle of 0°~90° in a bottom direction about the first pivot axis.

The first blade may be in a shape of a plate, the plate extending such that one end thereof is positioned outside the first frame in order to increase an amount of force of seawater applied thereto when the first blade rotates about the first pivot axis.

The first rotary unit may further include a ring-shaped second frame spaced apart a predetermined distance from the first frame in a direction of the extension of the center of rotation, the second frame being supported by the first frame.

The second rotary unit may include a third frame coupled to the drive shaft of the generator, the second blade being disposed on the third frame.

The third frame may be in a shape of a ring that is disposed about the extension of the center of rotation. A plurality of the second blades may be disposed on an outer circumference of the ring-shaped third frame and are spaced apart from each other.

The second blade may be positioned at rear of the second pivot axis when viewed in a direction in which the second rotary unit rotates.

The second blade may pivot to an angle an angle of 0°~90° in a top direction and an angle of 0°~90° in a bottom direction about the second pivot axis.

The second blade may be in a shape of a plate, the plate extending such that one end thereof is positioned outside the third frame in order to increase an amount of force of seawater applied thereto when the second blade rotates about the second pivot axis.

The second rotary unit may further include a ring-shaped fourth frame spaced apart a predetermined distance from the second frame in a direction of the extension of the center of rotation, the fourth frame being supported by the third frame.

The wave power generating apparatus may further include a gearbox coupled between the drive shaft of the generator and the second rotary unit.

The wave power generating apparatus may further include: a storage battery disposed in a part of the floating part; a support coupled to a lower part of the floating part and rotatably supporting the generator; and a slip ring coupled to the support. Electricity generated from the generator rotating about the support is transmitted to the storage battery through the slip ring.

The first rotary unit may be symmetric to the second rotary unit in a top-bottom direction about the generator.

The generator may include: a stator disposed inside the housing; and a rotor rotatably disposed inside the housing, the drive shaft being coupled to a portion of the rotor.

In the wave power generating apparatus according to an embodiment of the invention, as the floating part moves upwardly and downwardly following waves moving up and down, the blades coupled the first and second rotary unit pivot, then the first rotary unit coupled to the housing of the generator and the second rotary unit coupled to the drive shaft rotate respectively in the opposite direction to each other, thereby generates electricity.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to an exemplary embodiment of the present invention, an example of which is illustrated in the accompanying drawings, so that a person skilled in the art to which the present invention relates can easily put the present invention into practice. The present invention can be embodied in a variety of different forms, and it should not be understood that the present invention is limited to those disclosed herein. Throughout the drawings, those irrelevant to the description are omitted for the sake of clarity. Throughout this document, reference should be made to the drawings, in which the same reference numerals and symbols are used throughout the different drawings to designate the same or similar components.

Figure 1:
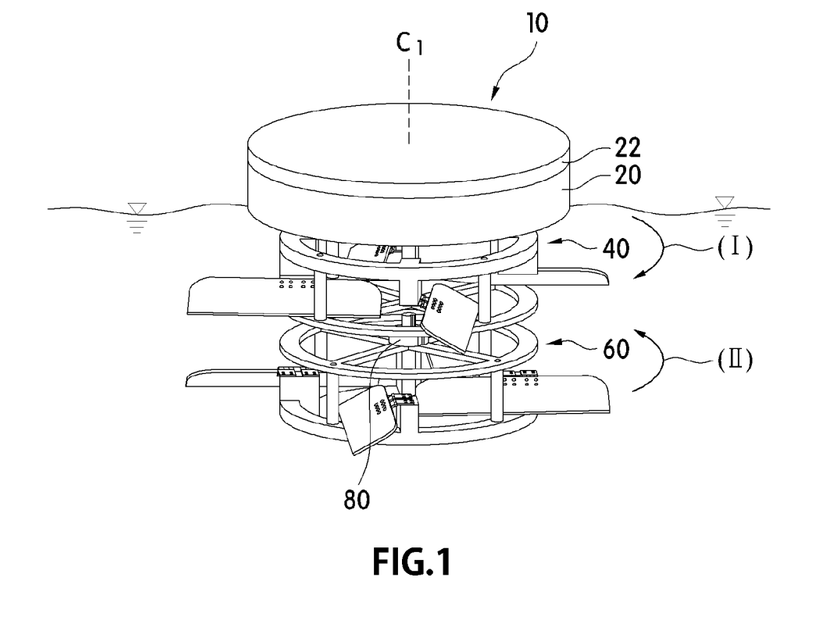
FIG. 1 is a perspective view illustrating a wave power generating apparatus according to an exemplary embodiment of the present invention.
Figure 2:
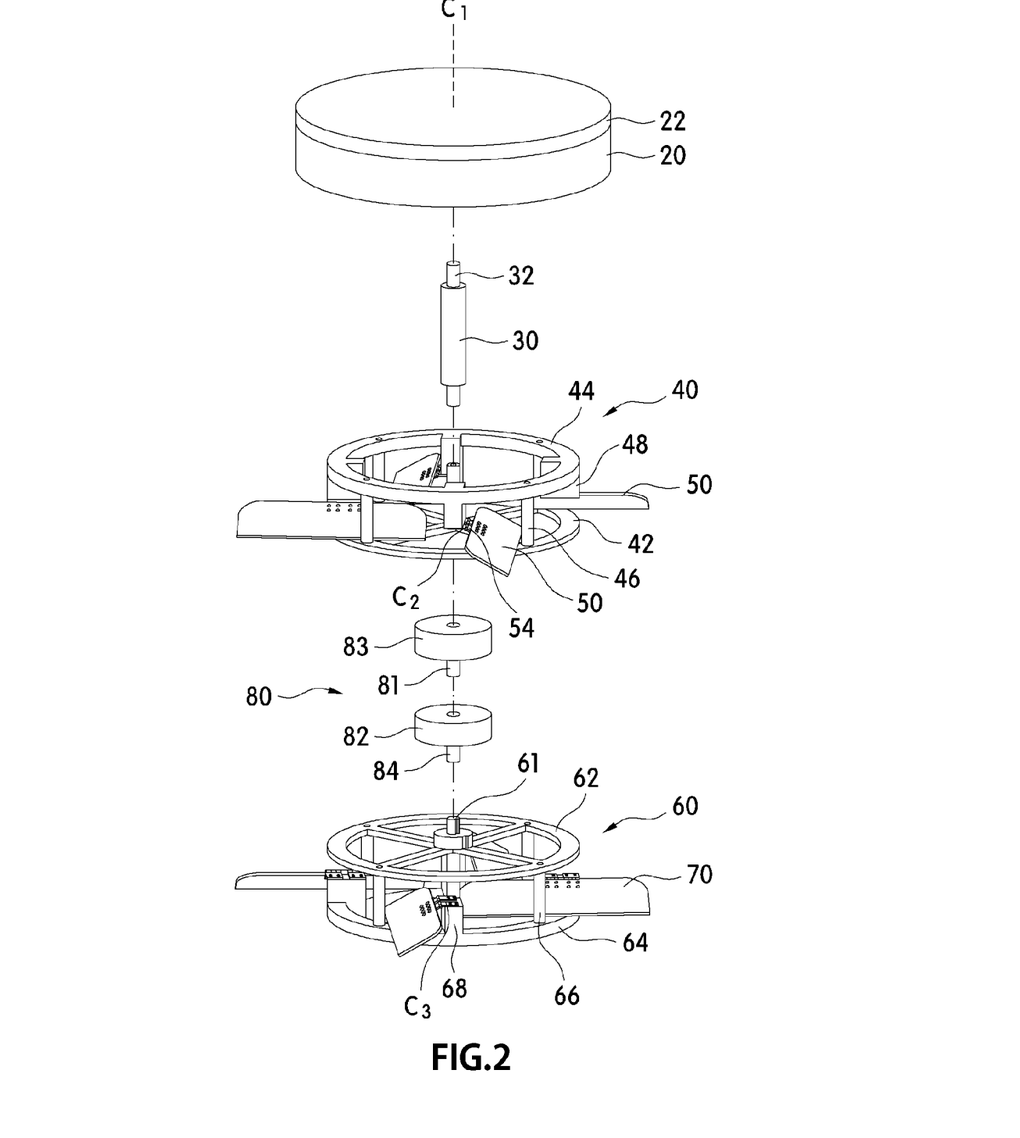
FIG. 2 is an exploded perspective view of the wave power generating apparatus illustrated in FIG. 1.
Figure 3:
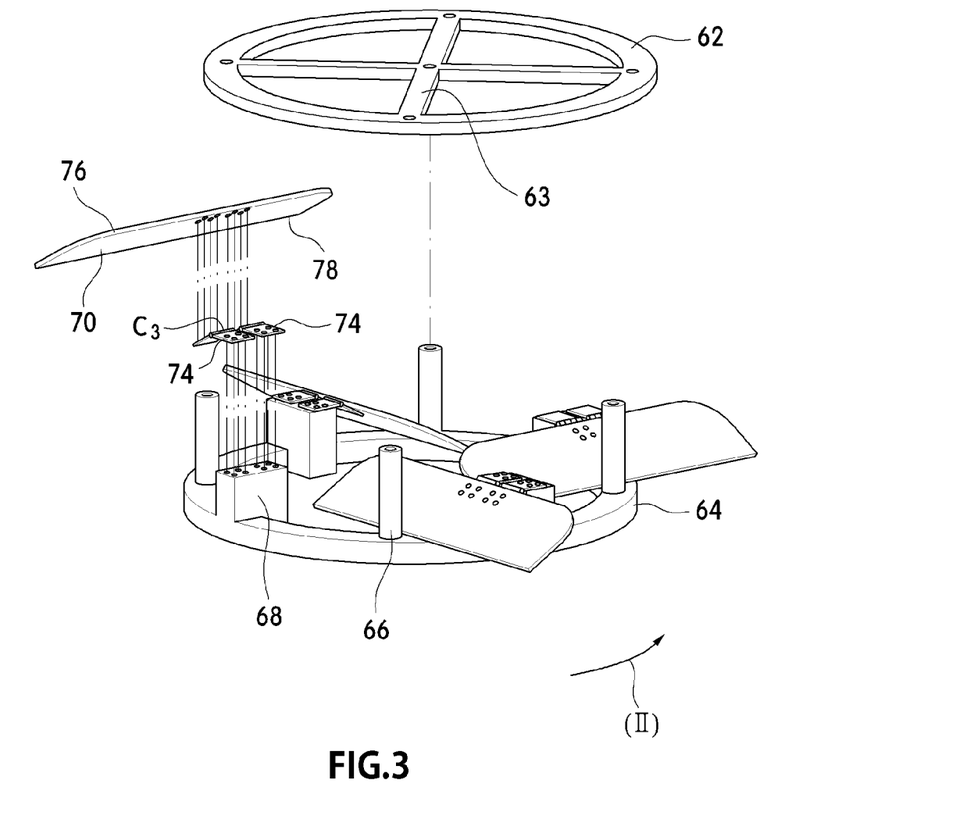
FIG. 3 is an exploded perspective view of the second rotary unit of the wave power generating apparatus illustrated in FIG. 1.

FIG. 1 is a perspective view illustrating a wave power generating apparatus according to an exemplary embodiment of the present invention, FIG. 2 is an exploded perspective view of the wave power generating apparatus illustrated in FIGS. 1, and 3 is an exploded perspective view of the second rotary unit of the wave power generating apparatus illustrated in FIG. 1.

Referring to FIGS. 1 and 2, the wave power generating apparatus 10 includes a floating part 20, a generator 80, a storage battery 22, a first rotary unit 40, and a second rotary unit 60.

Referring to FIGS. 1 and 2, the wave power generating apparatus 10 according to this embodiment is configured such that the first rotary unit 40 coupled to the housing of the generator 80 and the second rotary unit 60 coupled to the drive shaft of the generator 80 rotate in opposite directions when the wave power generating apparatus 10 is moved upwardly and downwardly in the water by waves in the state in which the floating part 20 is floating on the sea surface. At this time, the rotation of the first rotary unit and the rotation of the second rotary unit are driven by the force of seawater applied to blades of the first and second rotary units. As the first rotary unit and the second rotary unit rotate in opposite directions, a rotor and a stator inside the housing of the generator 80 rotate in opposite directions such that the generator 80 can generate electricity.

More specifically, the floating part 20 may be implemented as a buoy having a preset size, the buoy being floatable on the sea surface. The size of the floating part 20 may be designed such that buoyancy able to support the entire weight of the wave power generating apparatus can be created.

Referring to FIG. 1, in the wave power generating apparatus 10 according to this embodiment, the floating part 20 has been illustrated as being cylindrically shaped. However, the floating part 20 can have any shape as long as it is floatable on the sea surface.

Referring to FIG. 1, the storage battery 22 is disposed in the upper part of the floating part 20. The storage battery 22 is electrically connected to the generator 80 that will be described later, and stores electricity generated by the generator 80.

Although the storage battery 22 was illustrated as being disposed in the upper part of the floating part 20 in this embodiment, the storage battery 22 can be positioned not only in the upper part of the floating part 20 but also in the lower part of the floating part 20 or underwater if the storage battery 22 is formed watertight.

Referring to FIG. 1, the generator 80, the first rotary unit 40, and the second rotary unit 60 are coupled to the lower part of the floating part 20. A support 32 is disposed on the lower part of the floating part 20 in order to rotatably support the generator 80, the first rotary unit 40 and the second rotary unit 60 on the lower part of the floating part 20.

The support 32 is configured as a rod-shaped member extending downward from the lower portion of the floating part. Here, according to an embodiment of the present invention, the support 32 can be positioned on an extension C1 of the center of rotation about which the generator 80 rotates.

The generator 80 is coupled to the bottom end of the support 32. A bearing may be disposed between the support 32 and the generator 80 such that the generator 80 can rotate on the bottom end of the support 32.

A slip ring 30 is disposed on the outer circumference of the support 32. The slip ring 30 is a component that transmits electricity generated by the generator 80 rotating about the support 32 to the storage battery 22 positioned in the upper part of the floating part 20. With this configuration, the electricity generated by the generator 80 can be transmitted to the storage battery 22 through the slip ring 30 on the support 32 and through a cable (not shown) and subsequently stored in the storage battery 22.

Referring to FIG. 2, the housing 83 of the generator 80 coupled to the support 32 is in the shape of a cylinder, with the drive shaft 81 extending downwardly from the bottom of the housing. The drive shaft 81 of the generator 80 is disposed on the extension C1 of the center of rotation of the housing 83 of the generator 80. Although not shown, the rotor and the stator are disposed inside the generator 80 such that relative rotation of the stator and the rotor can generate electricity. As an example, the stator may be fixedly disposed on the inner surface of the housing 83 of the generator 80, and the rotor may be connected to the drive shaft 81 and rotatably disposed inside the housing.

Referring to FIGS. 1 and 2, the first rotary unit 40 is coupled to the housing 83 of the generator 80, and the second rotary unit 60 is coupled to the drive shaft 81 of the generator 80.

The first rotary unit 40 is coupled to the housing of the generator 80 to rotate together with the housing about the extension of the center of rotation, in the direction of an arrow I (clockwise direction; hereinafter referred to as the "first rotation direction") when shown in FIG. 1.

Referring to FIG. 2, the first rotary unit 40 coupled to the housing 83 of the generator 80 includes a first frame 44, a second frame 42 and first blades 50.

The second rotary unit 60 is rotatably coupled to the drive shaft 81 of the generator 80.

A gearbox 82 is disposed between the drive shaft 81 of the generator 80 and the second rotary unit 60. A center-of-rotation shaft 61 of the rotary unit 60 is coupled to a connecting shaft 84 of the gearbox 82. The gearbox 82 can increase the speed of revolutions of the drive shaft of the generator 80 following the speed of rotation of the second rotary unit 60 such that the drive shaft of the generator 80 has a speed in which power can be generated.

According to an embodiment of the present invention, the second rotary unit 60 is configured to rotate together with the drive shaft 81 in the direction of an arrow II (counterclockwise direction; hereinafter referred to as the "second rotation direction"), opposite to the first rotation direction in which the housing of the generator 80 rotates. The second rotary unit 60 includes a third frame 64, a fourth frame 62, and second blades 70.

According to an embodiment of the present invention, the first rotary unit 40 and the second rotary unit 60 are configured symmetric in the top-bottom direction about the generator 80. According to an embodiment of the invention, the first frame 44, the second frame 42, and the first blades 50 of the first frame 40 correspond to the third frame 64, the fourth frame 62, and the second blades 70 of the second rotary unit 60.

A description will be given below of the second rotary unit 60 with reference to FIG. 3. Here, since the structure of the first rotary unit 40 is symmetric to the structure of the second rotary unit 60, a detailed description of the first rotary unit 40 will be omitted.

Referring to FIG. 3, the second rotary unit 60 includes the third frame 64, the fourth frame 62, and the second blades 70.

The third frame 64 is in the shape of a ring that extends around the extension of the center of rotation, and the drive shaft 81 of the generator 80 is positioned at the center of rotation of the ring-shaped third frame 64. The third frame 64 is connected to the drive shaft 81 of the generator 80 through the fourth frame 62 and the gearbox 82.

Referring to FIG. 3, a plurality of connecting bars 66 extending upward are disposed on the top surface of the third frame 64. In this embodiment, the four connecting bars 66 are arranged on the top surface of the third frame 64 at intervals of 90°. The fourth frame 62 in the same ring-shape as the third frame 64 is coupled to and supported by the top ends of the connecting bars 66.

A cross-shaped fourth frame support 63 is disposed within the fourth frame 62, and a center-of-rotation shaft 61 is disposed on the central portion of the fourth frame support 63 positioned in the central portion of the fourth frame 62 such that the center-of-rotation shaft 61 is coupled to the connecting shaft 84 of the gearbox 82.

According to an embodiment of the present invention, the second blades 70 are disposed between the third frame 64 and the fourth frame 62. A plurality of the second blades are disposed on the outer circumference of the ring-shaped third frame such that the second blades are spaced apart from each other at preset distances.

Rectangular parallelepiped blade mounts 68 are disposed between the four connecting bars 66 such that the second blades 70 are disposed between the third frame 64 and the fourth frame 62. The blade mounts 68 protrude from the top surface of the third frame 64.

The second blades 70 are coupled to the top ends of the blade mounts 68. The second blades 70 are positioned at the rear of the blade mounts 68 when viewed in the direction of rotation of the second rotary unit 60, i.e. in the left of FIG. 3. The second blades 70 are coupled to the blade mounts 68 by hinge members 74. As illustrated in FIGS. 2 and 3, each second blade 70 can pivot about a second pivot axis C3 of the corresponding hinge member 74. As apparent from FIG. 2, the second pivot axis C3 is perpendicular to the extension C1 of the center of rotation. As apparent from FIGS. 2 and 3, each second blade 70 is in the shape of a plate in which one end portion 76 is positioned outside the third frame 64 in the radial direction and the other end portion 78 is positioned inside the third frame 64 in the radial direction in order to increase the amount of the force of seawater applied to the second blade 70 when the second blade 70 pivots about the second pivot axis C3.

Returning to FIG. 2, the first blades 50 corresponding to the second blades 70 can pivot about first pivot axes C2 of hinge members 54 coupled to blade mounts 48 of the first frame 44. As illustrated in FIG. 2, the first pivot axes C2 are arranged perpendicular to the extension C1 of the center of rotation. A plurality of the first blades 50 are disposed on the outer circumference of the ring-shaped first frame 44 such that the first blades 50 are spaced apart from each other. Like the second blades 70, each first blade 50 is in the shape of a plate in which one end portion is positioned outside the first frame 44 in the radial direction and the other end portion is positioned inside the first frame 44 in the radial direction in order to increase the amount of the force of seawater applied to the first blade 50 when the first blade 50 pivots about the first pivot axis C2.

According to an embodiment of the present invention, in the state in which the second blades 70 are disposed on the blade mounts 68, the second blades 70 can rotate upwards about the second pivot axes C3 of the second blades 70 to a preset angle with respect to a plane P2 parallel to the upper surface of the third frame 64. The second blades 70 are also rotatable downwards to a preset angle. The preset angle α of the second blades 70 is greater than 0° and smaller than 90°, for example, 30°. However, this is not intended to be limiting.

In the wave power generating apparatus according to an embodiment of the present invention, when the second rotary unit 60 moves upwardly or downwardly, the angle of the second blades 70 changes. Accordingly, the second rotary unit 60 can rotate in the same direction, i.e. the second rotation direction, regardless of whether the second rotary unit 60 moves upwardly or downwardly.

With reference to the figures, a more detailed description will be given below of the process in which the second rotary unit rotates in the second rotation direction by the force of the seawater.

Figure 4:
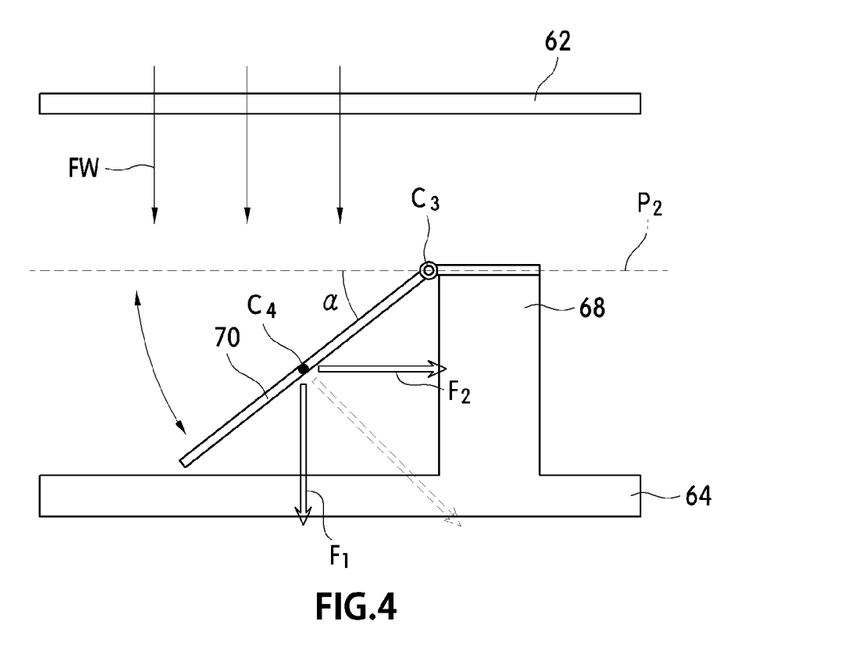
FIG. 4 illustrates the direction of power applied to the second blades of the second rotary unit in the state in which the wave power generating apparatus according to an embodiment of the present invention is moving upwardly.

FIG. 4 illustrates the direction of power applied to the second blades of the second rotary unit 60 in the state in which the wave power generating apparatus 10 according to an embodiment of the present invention is moving upwardly.

Referring to FIG. 4, in the state in which the second rotary unit 60, i.e. the entire wave power generating apparatus is moving upwardly on the wave, the force of seawater Fw acts downwardly, as illustrated in FIG. 4.

Consequently, as illustrated in FIG. 4, each second blade 70 disposed on the second rotary unit 60 becomes inclined downward at a preset angle α with respect to the plane P2, which is parallel to the top surface of the third frame 64 and on which the second pivot axis C3 of the second blade 70 is disposed.

The angle α at which the second blade 70 is inclined with respect to the plane P2 on which the second pivot axis C3 of the second blade 70 is disposed may vary according to the speed at which the second rotary unit 60 moves upwardly and the speed of the wave.

When the second blade 70 is subjected to the force of seawater Fw from the seawater that applies a downward pressure in the state in which the second blade 70 is inclined downward with respect to the plane P2 on which the second pivot axis C3 of the second blade 70 is disposed, the second blade 70 is subjected to a tension F1 in the downward direction thereof about the center C4 of the seawater pressure applied to the second blade 70 and is subjected to a thrust F2 in the second rotation direction thereof, as illustrated in FIG. 4.

Consequently, in the state in which the second blade 70 is inclined downward with respect to the plane P2 on which the second pivot axis C3 of the second blade 70 is disposed, the second blade 70 applies a force for rotating the second rotary unit 60 in the second rotation direction II to the second rotary unit 60. Accordingly, the second rotary unit 60 rotates in the second rotation direction II.

Figure 5:
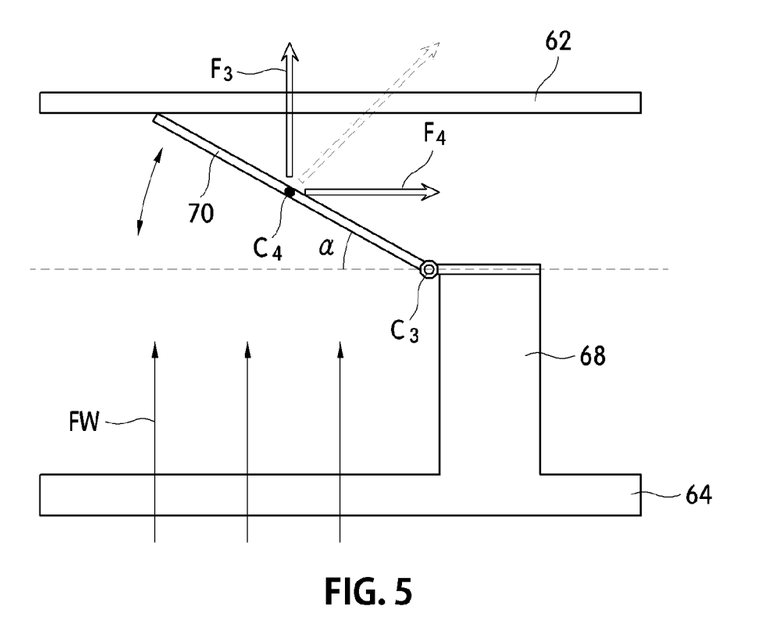
FIG. 5 illustrates the direction of power applied to the second blades of the second rotary unit in the state in which the wave power generating apparatus according to an embodiment of the present invention is moving downwardly.

FIG. 5 illustrates the direction of power applied to the second blades of the second rotary unit 60 in the state in which the wave power generating apparatus 10 according to an embodiment of the present invention is moving downwardly.

Referring to FIG. 5, in the state in which the second rotary unit 60 is moving downwardly, i.e. the entire wave power generating apparatus 10 is moving downwardly, the force of seawater F2 acts upwards, as illustrated in FIG. 5.

Consequently, as illustrated in FIG. 5, each second blade 70 disposed on the second rotary unit 60 becomes inclined upward at a preset angle α with respect to the plane P2, which is parallel to the top surface of the third frame 64 and on which the second pivot axis C3 of the second blade 70 is disposed.

The angle α at which the second blade 70 is inclined with respect to the plane P2 on which the second pivot axis C3 of the second blade 70 is disposed may vary according to the speed at which the second rotary unit 60 moves downwardly and the speed of the wave.

When the second blade 70 is subjected to the force of seawater Fw from the seawater that applies a downward pressure in the state in which the second blade 70 is inclined upward with respect to the plane P2 on which the second pivot axis C3 of the second blade 70 is disposed, the second blade 70 is subjected to a tension F3 in the upward direction thereof about the center C4 of the seawater pressure applied to the second blade 70 and is subjected to a thrust F4 in the second rotation direction thereof, as illustrated in FIG. 5.

Consequently, in the state in which the second blade 70 is inclined upward with respect to the plane P2 on which the second pivot axis C3 of the second blade 70 is disposed, the second blade 70 applies a force for rotating the second rotary unit 60 in the second rotation direction II to the second rotary unit 60. Accordingly, the second rotary unit 60 rotates in the second rotation direction II.

According to an embodiment of the present invention, regardless of whether the second rotary unit 60 is moving upwardly or downwardly, the second rotary unit 60 rotates in the second rotation direction by receiving a force of rotation in the second rotation direction II by means of the second blades 70. Consequently, the drive shaft 81 of the generator 80 coupled to the second rotary unit 60 rotates in the second rotation direction.

In contrast, the first rotary unit 40 rotates in the first rotation direction I opposite to the direction of rotation of the second rotary unit 60 regardless of whether the first rotary unit 40 is moving upwardly or downwardly, since the first rotary unit 40 is configured symmetric to the second rotary unit 60.

When the first rotary unit 40 rotates in the first rotation direction I in this manner, the housing 83 of the generator 80 coupled to the first rotary unit 40 also rotates in the first rotation direction.

When the housing 83 of the generator 80 coupled to the first rotary unit 40 rotates in the first rotation direction, the state inside the generator 80 rotates in the opposite direction to the direction of rotation of the second rotary unit 60, i.e. to the direction of rotation of the drive shaft of the generator 80. Consequently, the speed of rotation of the rotor with respect to the stator can be doubled comparing to the case in which only the second rotary unit 60 rotates, thereby increasing the efficiency of power generation.

The direction of rotation of the first rotary unit 40 becomes opposite to the direction of rotation of the second rotary unit 60 since the structure of the first rotary unit 40 is symmetric to the structure of the second rotary unit 60. The principle in which the first rotary unit 40 rotates in the first rotation direction I is the same as the principle in which the second rotary unit 60 rotates. Therefore, a detailed description of the rotation of the first rotary unit 40 will be omitted.

In the wave power generation apparatus according to an embodiment of the present invention as set forth above, the housing of the generator suspending from the floating part able to float on the sea surface is rotated in the first rotation direction by the first rotary unit while the second rotary unit connected to the drive shaft of the generator rotates in the opposite direction to the first rotation direction. Consequently, the rotor and the state inside the generator rotate in relation to each other, thereby generating electricity.

When the wave power generating apparatus according to an embodiment of the present invention moves upwardly and downwardly on waves in the state in which the floating part is on the sea surface, the first rotary unit and the second rotary unit rotate such that electricity is generated. Accordingly, it is possible to sustainably generate power using a simple structure.

In addition, since the first rotary unit and the second rotary unit are symmetric to each other in the top-bottom direction about the drive shaft of the generator, the wave power generating apparatus according to an embodiment of the present invention can reliably generate electricity on wavy seas.

Although the exemplary embodiments of the present invention have been described for illustrative purposes, a person skilled in the art will appreciate that various additions, modifications, omissions and substitutions are possible, without departing from the scope and spirit of the present invention as disclosed in the accompanying claims.

What is claimed is:

1. A wave power generating apparatus comprising:
   a floating part floatable on a sea;
   a generator coupled to the floating part, wherein the generator comprises a housing and a drive shaft coupled to the housing, the drive shaft being positioned on an extension of a center of rotation extending in a top-bottom direction from the housing;
   a first rotary unit coupled to the housing of the generator, the first rotary unit being rotatable in a first direction together with the housing about the extension of the center of rotation, wherein the first rotary unit comprises a first blade able to pivot about a first pivot axis perpendicular to the extension of the center of rotation; and
   a second rotary unit coupled to the drive shaft of the generator, the second rotary unit being rotatable together with the drive shaft in a second direction opposite to a direction in which the first rotary unit rotates, wherein the second rotary unit comprises a second blade able to pivot about a second pivot axis perpendicular to the extension of the center of rotation,
   wherein, when the generator, the first rotary unit and the second rotary unit are moved upwardly and downwardly in water by waves in a state in which the floating part is on a surface of sea and the first rotary unit and the second rotary unit are underwater, the first blade and the second blade rotate the housing and the drive shaft in opposite directions with a force from water applied to each of the first and second blades, such that the generator generates electricity.

2. The wave power generating apparatus according to claim 1, wherein the first rotary unit comprises a first frame coupled to the housing of the generator, the first blade being disposed on the first frame.

3. The wave power generating apparatus according to claim 2, wherein
   the first frame is in a shape of a ring that is disposed about the extension of the center of rotation, and
   a plurality of the first blades are disposed on an outer circumference of the ring-shaped first frame and are spaced apart from each other.

4. The wave power generating apparatus according to claim 2, wherein the first blade is positioned at rear of the second pivot axis when viewed in the direction in which the first rotary unit rotates.

5. The wave power generating apparatus according to claim 4, wherein the first blade is able to pivot to an angle of 0°~90° in a top direction and an angle of 0°~90° in a bottom direction about the first pivot axis.

6. The wave power generating apparatus according to claim 4, wherein the first blade is in a shape of a plate, the plate extending such that one end thereof is positioned outside the first frame in order to increase an amount of force of water applied thereto when the first blade rotates about the first pivot axis.

7. The wave power generating apparatus according to claim 4, wherein the first rotary unit further comprises a ring-shaped second frame spaced apart a predetermined distance from the first frame in a direction of the extension of the center of rotation, the second frame being supported by the first frame.

8. The wave power generating apparatus according to claim 1, wherein the second rotary unit comprises a third frame coupled to the drive shaft of the generator, the second blade being disposed on the third frame.

9. The wave power generating apparatus according to claim 8, wherein
   the third frame is in a shape of a ring that is disposed about the extension of the center of rotation, and
   a plurality of the second blades are disposed on an outer circumference of the ring-shaped third frame and are spaced apart from each other.

10. The wave power generating apparatus according to claim 8, wherein the second blade is positioned at rear of the second pivot axis when viewed in a direction in which the second rotary unit rotates.

11. The wave power generating apparatus according to claim 10, wherein the second blade is able to pivot to an angle of 0°~90° in a top direction and an angle of 0°~90° in a bottom direction about the second pivot axis.

12. The wave power generating apparatus according to claim 10, wherein the second blade is in a shape of a plate, the plate extending such that one end thereof is positioned outside the third frame in order to increase an amount of force of water applied thereto when the second blade rotates about the second pivot axis.

13. The wave power generating apparatus according to claim 9, wherein the second rotary unit further comprises a ring-shaped fourth frame spaced apart a predetermined distance from the second frame in a direction of the extension of the center of rotation, the fourth frame being supported by the third frame.

14. The wave power generating apparatus according to claim 1, further comprising a gearbox coupled between the drive shaft of the generator and the second rotary unit.

15. The wave power generating apparatus according to claim 1, further comprising:
   a storage battery disposed in a part of the floating part;
   a support coupled to a lower part of the floating part and rotatably supporting the generator; and
   a slip ring coupled to the support,
   wherein electricity generated from the generator rotating about the support is transmitted to the storage battery through the slip ring.

16. The wave power generating apparatus according to claim 1, wherein the first rotary unit is symmetric to the second rotary unit in a top-bottom direction about the generator.

17. The wave power generating apparatus according to claim 1, wherein the generator comprises:
   a stator disposed inside the housing; and
   a rotor rotatably disposed inside the housing, the drive shaft being coupled to a portion of the rotor.

* * * * *